April 3, 1962     A. SILVER     3,027,904

PNEUMATIC CONTROL APPARATUS

Original Filed Aug. 25, 1952     2 Sheets-Sheet 1

ALEXANDER SILVER,
INVENTOR.

BY John H.T. Wallace

ALEXANDER SILVER,
INVENTOR.

BY John H.T. Wallace

United States Patent Office
3,027,904
Patented Apr. 3, 1962

3,027,904
PNEUMATIC CONTROL APPARATUS
Alexander Silver, Tarzana, Calif., assignor to The Garrett Corporation, Los Angeles, Calif., a corporation of California
Original application Aug. 25, 1952, Ser. No. 306,139, now Patent No. 2,775,231, dated Dec. 25, 1956. Divided and this application Aug. 16, 1956, Ser. No. 604,421
11 Claims. (Cl. 137—82)

The present invention relates generally to control apparatus, and is more particularly concerned with pneumatic control apparatus which relies for its operation upon variations in the ratio between predetermined fluid pressures.

This application is a true division of my co-pending application, Serial No. 306,139, filed August 25, 1952, and entitled "Pneumatic Control Apparatus," now Patent No. 2,775,231.

Heretofore, when it was desired to effect large changes in the pressure ratio setting of a control mechanism the utilization of control apparatus of the conventional type has been impractical. Any solution of the problem should desirably exclude the necessity for changing the areas of pistons, diaphragms, chambers and the like, or changing lever area ratios, as such arrangements become overly complicated and impractical for extremely large pressure ratio changes.

The problem is of particular significance in certain applications, such as speed governors, and like devices, where a ratio type of control is desirable whose setting is varied as a function of another variable such as temperature. The standard bellows and/or diaphragm area ratio arrangement is unsatisfactory where a large variable ratio is of primary importance.

With the foregoing in mind, the present invention has for one object the provision of control apparatus which utilizes the critical flow or sonic velocity of a fluid through the throat of a properly shaped restriction, for example, such as a nozzle, to provide pressures which are proportionate to a pressure having large variations, but which are within such ranges as to permit utilization of movable wall means for the actuation of control devices.

A further object is to provide control mechanism, wherein an orifice-nozzle or nozzle-nozzle combination, operating on the principles of critical flow is utilized as a pressure divider, and is arranged to actuate a control device in response to changes in a characteristic of a sensed medium, such as pressure, temperature, and the like.

Another object of the invention is to provide in devices of the character described, a pressure divider having an improved nozzle construction containing a sharp leading or entrance edge.

Still another object of the invention is to provide improved pressure ratio control apparatus, which is extremely reliable in operation, inherently resistant to temperature changes and vibration, more economical to build, and which occupies less space, is simple of construction but capable of rugged use.

To this end, the present invention in one form briefly comprises some form of mechanism arranged to operate in response to variations in a pressure ratio, the ratio pressures being obtained by means of a pressure divider utilizing an orifice-orifice and/or orifice-nozzle arrangement connected for series fluid flow through restricted passages wherein sonic velocity is obtained in the throats of the orifices and nozzles. The ratios of pressures are balanced by the ratios of the areas of movable wall means upon which the pressures obtained from the pressure divider are acting. Any change in the predetermined or function variable ratios is arranged to create an unbalance which is utilized to activate some form of control device, or the pressure ratio may be modified by a function of some other auxiliary control.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

Figure 1:
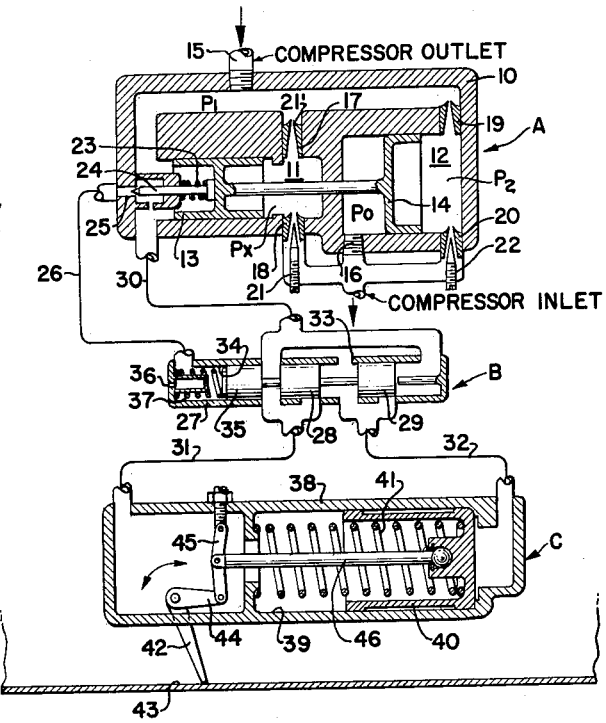
FIG. 1 is a view schematically illustrating one form of control apparatus embodying the features of the invention, arranged to operate in response to the changes in the ratio of inlet and outlet pressures of a compressor.

Referring more specifically to the drawings, for illustrative purposes, FIG. 1 illustrates control apparatus according to the present invention which embodies three component devices, namely, a pressure ratio sensing unit A, a pneumatic relay B and a valve actuator mechanism C.

As shown, the pressure ratio sensing unit A comprises a housing structure 10 of suitable material, this housing having an internal valve structure so formed as to provide internal cavities or chambers 11 and 12 which in this instance form cylinders within which interconnected pistons 13 and 14 respectively are supported for reciprocal movement.

The housing 10 is provided with a connection 15 which is connectible with a source of fluid pressure, shown in this instance as being a compressor outlet, and a connection 16 to atmosphere or the compressor inlet. The high pressure within the housing 10 is indicated by the designation $P_1$, whereas the connection to atmosphere pressure is indicated by $P_0$. These pressures are interconnected within the housing through parallel flow passages which respectively include the chambers 11 and 12. The chamber 11 is intermediate an upstream nozzle 17 and a downstream nozzle 18, whereas the chamber 12 is intermediate an upstream nozzle 19 and a downstream nozzle 20. The nozzles are so designed that the ratio of exit pressure to the entrance or upstream pressure is less than a critical value, depending upon the particular fluid being handled, and such that sonic velocity is attained at the throat. By utilizing a divergent conical passage from the throat of the nozzle, a considerable recovery of pressure is obtained without altering the critical ratio existing between the pressure at the throat of the nozzle and the entrance. By this means sonic flow will be obtained at the throat of both nozzles although the ratio of exhaust or recovered pressure at the end of the divergent nozzle to the total pressure at the nozzle inlet is higher than the critical pressure ratio required for sonic flow through the nozzle. This greatly extends the range of operation of the ratio sensing unit.

The sets of nozzles thus provided in each of the parallel flow paths forms in effect a pressure divider which acts to form an intermediate pressure $P_x$ in chamber 11 and an intermediate pressure $P_2$ in chamber 12, which proportionally reflect over a smaller range variation in the upstream pressure $P_1$. While the nozzles of the pressure divider may be as described above, the linear operation of the divider may be extended at lower inlet densities of the fluid by providing a sharp inlet or leading edge 21', as indicated in FIG. 1.

The intermediate pressures $P_x$ and $P_2$ may be adjustably controlled by adjusting the flow through either the upstream nozzle or the downstream nozzle. In the present instance, provision is made for adjusting flow through the nozzle 18 by means of an adjustable needle valve 21, and the flow through nozzle 20 by a needle valve 22.

In the arrangement shown, the intermediate pressures $P_x$ and $P_2$ respectively act in the same direction against the interconnected pistons 13 and 14 respectively, while the upstream pressure $P_1$ and pressure $P_0$ respectively act on the pistons 13 and 14 in the opposite direction. Thus an arrangement is provided wherein a balanced condition may be established for a desired overall pressure ratio $$\frac{P_1}{P_0}$$

by adjusting the needle valves 21 and 22.

First the needle valve 22 is adjusted so that the ratio of $P_2$ to $P_1$ is the same as the ratio of the effective area of piston 13 to piston 14. Thus, the forces acting on the ends of the pistons 13 and 14 will be balanced for all values of $P_1$ sufficiently high to cause sonic flow in the throat of nozzles 19 and 20. Next, the needle valve 21 may be adjusted to give a pressure $P_x$ so that the ratio of $P_1$ to $P_x$ times the ratio of the effective areas of piston 14 to piston 13 is equal to the desired overall ratio of $P_1$ to $P_0$.

A light spring 23 is provided so that during movement of the interconnected pistons 13 and 14, or other suitable wall means, such as interconnected diaphragms or the like, this spring will act to diminish instability or droop. Advantage may be taken of such movement of the piston structure to operate a suitable device. In this case, the movable wall means are connected to a valve 24 which is operatively associated with a port opening 25 and controls the flow of high pressure $P_1$ fluid into a connection conduit 26.

The pneumatic relay B, as disclosed, comprises briefly an elongate housing 27 within which is reciprocally mounted a pair of valve members 28 and 29 by which the high pressure $P_1$ in a connection conduit 30 is selectively connectible with conduits 31 and 32, the conduit which is not connected to the high pressure being vented through a port opening 33.

One end of the housing 27 is arranged to form a pneumatic cylinder 34 having operative relationship with a piston 35 which is connected to the valve members 28 and 29. The left end of the cylinder 34 is connected with conduit 26, and is also vented to atmosphere through a restricted passage 36, and houses an expansion spring 37 which exerts a biasing action upon the piston 35 tending to move the valves to a position wherein conduit 31 is connected to the pressure $P_1$ and conduit 32 is vented to atmosphere.

The valve actuator mechanism C may assume varied forms of construction. In the present case, it is shown as comprising a hollow housing 38, a portion of this housing being arranged to form a pneumatic cylinder 39 within which there is reciprocally mounted a piston 40 which is normally biased toward the right end of the cylinder by an expansion spring 41.

Movements of the piston 40 are utilized to actuate a valve 42 positioned in a flow duct 43. The valve is swingably supported and carries an actuating crank arm 44 having its outer end connected with a toggle joint 45 which is interconnected with the piston 40 through a piston rod 46. The conduits 31 and 32, it will be observed, communicate with opposite sides of the piston 40 and the valve 42 is arranged to be in closed position, when the piston 40 is at the extreme position of its movement to the right end of the cylinder 39.

Having explained this embodiment of the invention in detail, the operation will now briefly be considered. As before mentioned, the needles 21 and 22 are adjustable so as to select any desired pressure ratio above a certain minimum, such minimum being established by design characteristics of the particular nozzles. For example, if it is desired to actuate the valve 42 in the opening direction when the pressure ratio reaches or exceeds 4:1, suitable values for the areas of pistons 13 and 14 are so chosen that the piston 14 will be twice that of piston 13, and the pressure ratio $$\frac{P_1}{P_2}$$

will be set to balance at the same ratio. The pressure ratio selector needle 21 will then be set so as to cause $$\frac{P_1}{P_x}$$

to equal 2, in which case the overall ratio $$\frac{P_1}{P_0}$$

will equal 4:1. This would constitute the balanced condition of the movable wall structure. When the high pressure $P_1$ is below a value at which the balanced condition obtains, the unbalance of the movable wall structure is in a direction to maintain the valve 24 in the open position.

With the valve 24 open, the pressure $P_1$ flows through conduit 26 to the cylinder 34, where, with the aid of the spring 37, it forces the piston 35 and the connected valve members 28 and 29 to the right so that the pressure $P_1$ is admitted through conduit 31 to the left side of the piston 40 of the valve actuator mechanism C. The pressure $P_1$ augmented by the force of the spring 41 actuates the toggle joint 45 in a direction to hold the valve 42 in the closed position.

When the set ratio $$\frac{P_1}{P_0}$$

is attained, a balanced condition is reached in the ratio sensing unit A, as explained hereinabove. If the high pressure $P_1$ increases to a value above that at which the balanced condition obtains, the valve 24 is moved to a closed position to shut off flow through conduit 26. Pressure in the cylinder 34 will then bleed through the restricted passage 36 to atmosphere permitting the pressure $P_1$ which is always present at the other end of the housing 27 to move the valves 28 and 29 to a position wherein valve 29 will connect the pressure $P_1$ with conduit 32 to overcome the force of the spring 41 and move the piston 40 in a leftwardly direction to open the valve 42. It will be appreciated that the utilization of the pressure ratio sensing unit A in connection with the other components just described is exemplary of only one manner of use of the sensing unit, and varied arrangements are possible to meet the particular installation conditions.

Figure 2:
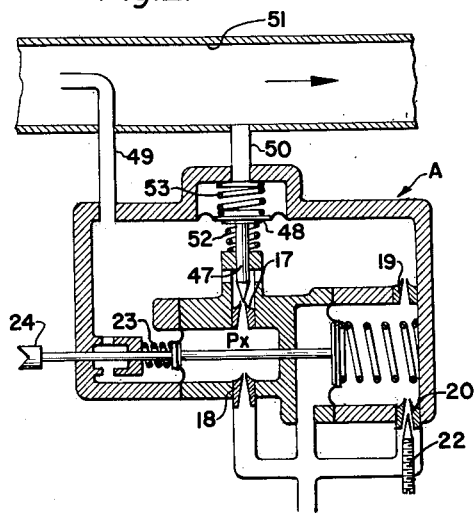
FIG. 2 is a modified arrangement, wherein the compressor outlet pressure is modified in accordance with the differences in static and dynamic pressures.

Referring to FIG. 2, a modified construction of the sensing unit A is disclosed which embodies the basic principles of the unit shown in FIG. 1, except that diaphragms have been utilized instead of movable pistons.

The needle 21 has been deleted, and in its stead, there is provided a needle 47 for controlling the flow through nozzle 17. This needle is operatively connected with a diaphragm 48 or other equivalent structure having its opposite sides connected through connection conduits 49 and 50 with a fluid flow duct 51 in such manner that the needle will modify the flow through the nozzle 17 and consequently the intermediate pressure $P_x$, in accordance with dynamic and static conditions of the fluid in the duct 51. The diaphragm 48 is also acted upon by associated coil springs 52 and 53 respectively positioned on opposite sides thereof.

When the modified form of construction described above is supplied with a flow of fluid through the duct 51 it will operate the valve 24 to maintain the desired ratio between the total pressure $P_1$ which is sensed by the conduit 49 and the pressure $P_0$ which is the inlet pressure of the compressor. The sensing unit operates in the same manner as described above for FIGURE 1, the only difference being that the needle 47 which controls the area of the orifice 17 is positioned in response to the flow through the duct 51. When the flow through the duct 51 is materially reduced so that it approaches the point of no flow it will indicate the tendency of the compressor to surge or hunt. Under these conditions of low flow the difference between the total pressure sensed by the conduit 49 and the static pressure sensed by the conduit 50 will be substantially reduced thus allowing the spring 53 to move the needle 47 in a direction to reduce the area of the nozzle 17. The reduced area of the nozzle 17 will increase the ratio between the inlet pressure $P_1$ and the pressure $P_x$. This increased pressure ratio will decrease the pressure $P_x$ and permit the spring 23 acting on one side of the smaller diaphragm to open the valve 24, which movement can be used to position a by-pass valve to control the surging condition of the compressor.

Figure 3:
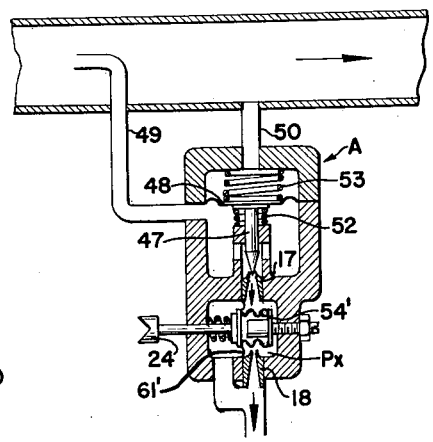
FIG. 3 illustrates a further modification wherein the intermediate pressure is utilized as a multiplier in combinaton with an evacuated bellows.

Referring now to FIG. 3, this embodiment of the invention is similar to the arrangement shown in FIG. 2, insofar as it provides for modification of the intermediate pressure $P_x$ in accordance with dynamic and static conditions of the high pressure fluid. This arrangement, however, differs in that instead of utilizing nozzles arranged to provide parallel connected pressure dividers, only two nozzles in this case are used to provide a single pressure divider. Further, in this embodiment, a single diaphragm 61' is utilized, and one side of the diaphragm 61' is connected to an evacuated bellows 54' having its exterior subject to the intermediate pressure $P_x$ while the other side of the diaphragm is subject to the lower pressure $P_0$ thus introducing an absolute pressure factor into the differential pressure ratio acting on the diaphragm, such arrangements being conventional in pressure ratio control devices.

Figures 4, 5:
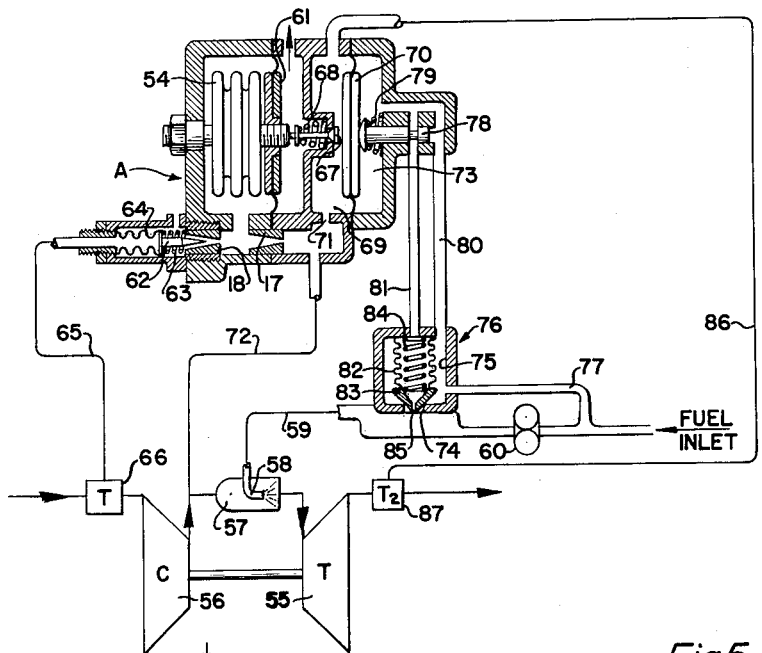
FIG. 4 is a view illustrating the present invention as applied to a speed governor for a gas turbine.
FIG. 5 illustrates another modified form, wherein the pressure ratio is varied in response to temperature changes of a sensed medium.

Referring to FIG. 4, there is disclosed an arrangement wherein the features of the present invention are arranged as a governor in connection with gas turbine installation in which a turbine 55 is connected with a compressor 56, the compressor being utilized to furnish combustion air to a combustion chamber 57 wherein fuel is delivered to a suitable nozzle 58 through a supply conduit 59 from fuel pump 60.

In this case a sensing unit A is arranged with a single set of nozzles to provide a pressure divider similar to the arrangement shown in FIG. 3. Also, it will be perceived that a single diaphragm 61 is connected with an evacuated bellows 54 and subject to the intermediate pressure on one side of the diaphragm, the other side of the diaphragm likewise being subject to atmospheric pressure.

In this form of the invention, however, provision is made for modulating the intermediate pressure in response to temperature changes. For such purposes, a needle 62 is associated with the nozzle 18. This needle is shown as being biased in one direction by an associated spring 63, and in an opposite direction by bellows 64 which is operatively connected through a capillary tube connection 65 with a suitable temperature sensor 66 mounted in the intake of compressor 56.

Movements of the diaphragm 61 are utilized to control a valve 67, which is normally held in closed position by a spring 68, this valve in open position acting to connect a chamber 69 on one side of diaphragm 70 with atmosphere. The chamber 69 is connected through an orifice 71 with the pressure upstream of nozzle 17, which pressure in this case is the outlet pressure of compressor 56 obtained through conduit connection 72.

The other side of the diaphragm 70 is exposed to chamber 73 which is in communication with a bypass around the fuel pump 60 composed of a valve seat opening 74, chamber 75 of unloading valve 76 and conduit 77.

The movements of diaphragm 70 are utilized for actuating a fuel servo metering valve 78 which is normally biased by a spring 79 into engagement with the diaphragm 70, and to open position completing a passage through conduits 80 and 81 from the chamber 75 to the interior of a bellows 82 which carries valve 83 at its free end, this valve being operatively associated with the valve seat opening 74 and biased toward seating position by means of a coil spring 84. The valve 83 has a restricted discharge orifice 85 therein.

Provision is also made for bleeding chamber 69 through a conduit connection 86 having a valve 87 arranged to open and close in response to temperature variations in the discharge from the turbine 55.

In operation, the needle 62 which controls the area of the orifice 18 is modulated in response to temperature changes of the fluid at the sensor 66. Thus, if the temperature of the fluid at the sensor 66 falls below a preselected temperature, the needle 62 is moved away from the orifice 18 to permit greater flow through the orifice and thus decrease the intermediate pressure between the orifices 17 and 18. As the intermediate pressure decreases the evacuated bellows 54 will expand to move the valve 67 toward open position, to the right as shown in the drawing, permitting fluid to flow from the chamber 69 to atmosphere. As the pressure in chamber 69 decreases the diaphragm 70 will move to the left, as shown in the drawing, and the servo metering valve 78 will be positioned to throttle the flow of fuel through the conduit 81 to maintain an optimum operating condition.

As the temperature of the fluid at the sensor 66 returns to the preselected temperature, the increase in the temperature of the fluid will cause the sensor means to move the needle 62 toward the orifice 18 and the intermediate pressure between the orifices 17 and 18 will increase. As the intermediate pressure increases, the evacuated bellows 54 will contract and the valve 67 will be moved toward the closed position, to the left as shown in the drawing, thus increasing the pressure in the chamber 69. The resulting increase in pressure in chamber 69 will move the diaphragm 70 to the right and the servo metering valve 78 will be repositioned to restore the system to the desired operating condition.

FIG. 5 illustrates still another modfication in which a temperature sensing element is utilized. The arrangement in this case similarly employs two pressure dividers in parallel flow passages in the same manner as shown generally in FIG. 1. However, in the arrangement of FIG. 5, the nozzle 20 has been replaced by an orifice 88 and the needle 22 is associated with the nozzle 19 for utilization in regulating the intermediate pressure $P_2$.

Flow through the orifice 88 is modulated in response to temperature changes of a sensed medium by means of a valve disk 89 arranged for limited movement within a sleeve member 90 supported for guiding movement within a chamber 91. The valve disk 89 is biased by a spring 92 toward a limiting position of movement, and the sleeve 90 is likewise biased in a downward direction by a spring 93 with a portion of the sleeve making pressure engagement with one end of a rod member 94 which extends into a tubular extension 95 of the housing and has its other end bearing against the associated end of the extension. Also provided in the housing 95 is a vent opening 130 to permit the fluid flowing from the orifice 88 to escape to the surrounding atmosphere. The rod 94 and the housing 95 are constructed of materials having different temperature coefficients, the housing extension being of a material which will expand a greater amount than the material of the rod 94 for a specific temperature change. Thus, with temperature increases, the effect is to move the valve disk 89 away from the open end of orifice 88 to permit greater flow and thus decrease the intermediate pressure $P_2$.

The two pressure dividers are connected to form a pneumatic bridge in which the nozzles 17 and 19 are connected to a common source of pressure, and in which the intermediate chambers between the nozzles of the pressure dividers are respectively connected through conduits 96 and 97 with chambers 109 and 110 of a balanced pilot valve in which the intermediate pressures $P_x$ and $P_2$ of the pneumatic bridge are applied on the opposite sides of a diaphragm 98 carried by a shaft 111. The shaft 111 also carries a diaphragm 112 positioned between and separating chambers 113 and 114, these chambers being interconnected through a passage containing a restricted orifice 115. The shaft is supported for reciprocable movements on small spaced flexible supports which consist of an intermediate diaphragm 116 between the chambers 110 and 113, a diaphragm 117 adjacent one end of the shaft and separating chamber 114 from ambient atmosphere, and a diaphragm 118 adjacent the other end of the shaft and separating chamber 109 from ambient atmosphere. The normal axial position of the shaft 111 is determined by means of suitable balancing springs 119 mounted at the shaft ends, one of which may be adjusted by means of a threaded stud structure 120.

A bleed valve 99 is arranged to control flow from a conduit 100 to atmosphere in response to movements of shaft 111. The valve 99 has a stem 121 which abuts the diaphragm 118, the valve being biased towards seating position by an expansion coil spring 122.

The conduit 100 is in communication with the chamber 114 through a restricted orifice 123 and also with one side of a diaphragm 101 of an actuator 102, which has a stem 103 operatively connected with a valve 104 for controlling in this case the flow of a fluid, for example, through a pipe 105. The opposite side of the diaphragm 101 is engaged by an expansion spring 106 which biases the diaphragm in a direction to cause opening of the valve upon decrease of the pressure acting on the opposite side of the diaphragm from that upon which the spring 106 bears. As shown, pressure is supplied from the high pressure source through a conduit 107, a restricted orifice 108, and thence through conduit 100 for motivating the actuator 102 in response to the operation of the valve 99.

Thus, in the arrangement shown, when the diaphragm 98 is in a balanced condition and the disk valve 89 is moved toward the orifice 88, the pressure $P_2$ is increased and acts to force the diaphragm 98 upwardly to open the valve 99 so as to reduce the pressure acting on the diaphragm 101. Upon reduction of this pressure, the spring 106 forces the diaphragm downwardly and causes the valve 104 to move toward a position of increased opening. Conversely, upon increased temperatures of the sensed medium, the valve 104 will be actuated toward closed position. It is possible that a condition may arise wherein the pressure in conduit 107 may suddenly vary without there being a change in differential pressure acting on the diaphragm 98, which would tend to open or close the valve 99. As a consequence, this change in pressure would tend to be carried through the conduit 100 and cause the actuator 102 to effect an undesired change in the position of valve 104. This is counteracted by a stabilizing action of the pilot valve. For example, if the pressure increases in conduit 100, tending to close valve 104, there will be a flow through the restricted orifice 123 into chamber 114, wherein the increased pressure will act through the diaphragm 112 and move shaft 111 in a direction to slightly increase the opening of valve 99 and thus restore the pressure in conduit 100 and reestablish the position of the valve 104.

From the foregoing, it will be appreciated that the present invention is susceptible of varied embodiments depending upon the particular installation in which it is to be utilized, and that as a consequence various other modifications may suggest themselves to those skilled in the art without departing from the spirit of the invention disclosed herein. It is therefore not desired to restrict the invention to the specific form or forms shown or uses mentioned, except to the extent indicated in the appended claims.

I claim:

1. Control apparatus, comprising: a pair of parallel flow passages connected between a high pressure fluid source and a low pressure fluid source; a pair of spaced sonic velocity flow restrictions in each of said flow passages, whereby intermediate flow pressures are effected; movable wall means including areas having said intermediate pressures acting thereon in one direction, and said high and low pressures in an opposite direction; a control device varied in response to movement of said wall means; and means for adjustably regulating flow through at least one of said flow restrictions of each pair.

2. Control apparatus, comprising: sonic flow pressure divider means connected between a high fluid pressure and a low fluid pressure to provide at least one intermediate fluid pressure; movable wall means balanced by a predetermined value of said intermediate pressure acting on one side and predetermined values of said high and low pressures acting on the opposite side thereof; means biasing said wall means in one direction, during said balanced condition; a fluid operated actuator; and valve means responsive to movements of said wall means for controlling said actuator.

3. Control apparatus, comprising: a pair of parallel flow passages connected between a high pressure fluid source and a low pressure fluid source; a pair of spaced sonic velocity flow restrictions in each of said flow passages, whereby intermediate flow pressures are effected; movable wall means including areas having said intermediate pressures acting thereon in one direction, and said high and low pressures in an opposite direction; a control device varied in response to movements of said wall means; and means for modifying one of said intermediate pressures in accordance with variations in static and dynamic differences of said high pressure fluid.

4. Control apparatus, comprising: sonic flow pressure divider means connected between a high fluid pressure and a low fluid pressure to provide an intermediate fluid pressure; movable wall means acted upon by said pressures and arranged to be balanced at predetermined values of said pressures; means biasing said wall means in one direction, during said balanced condition; a control device varied in response to movements of said wall means; and means for modifying the action of said pressures on said movable wall means in accordance with variations in static and dynamic characteristics of said high fluid pressure.

5. Control apparatus, comprising: a pair of parallel flow passages connected between a high pressure fluid source and a low pressure fluid source; a pair of spaced sonic velocity flow restrictions in each of said flow passages, whereby intermediate flow pressures are effected; movable wall means including areas having said intermediate pressures acting thereon in one direction, and said high and low pressures in an opposite direction; and a control device varied in response to movement of said wall means.

6. Control apparatus, comprising: sonic flow pressure divider means connected between a high fluid pressure and a low fluid pressure to provide at least one intermediate fluid pressure; movable wall means balanced by a predetermined value of said intermediate pressure acting on one side and predetermined values of said high and low pressures acting on the opposite side thereof;

means biasing said wall means in one direction, during said balanced condition; and a control device varied in response to movements of said wall means.

7. Control apparatus, comprising: a pair of flow passages connected between a high pressure fluid source and a low pressure fluid source; a pair of spaced restricted sonic velocity flow openings in each of said flow passages, whereby an intermediate pressure is effected between each of said pair of flow openings; movable wall means including areas having said intermediate pressures acting thereon in one direction and said high and low pressures acting in an opposite direction; and means for varying one of said restricted openings in response to a characteristic of a sensed medium.

8. Control apparatus, comprising: a pair of flow passages connected between a high pressure fluid source and a low pressure fluid source; a pair of spaced restricted sonic velocity flow openings in each of said flow passages, whereby an intermediate pressure is effected between each of said pair of flow openings; movable wall means including areas having said intermediate pressures acting thereon in one direction and said high and low pressures acting in an opposite direction; and means for adjusting at least one of said restricted openings to pre-set the intermediate pressure in said passage to a desired value.

9. Control apparatus, comprising: a pair of flow passages connected between a high pressure fluid source and a low pressure fluid source; a pair of spaced restricted sonic velocity flow openings in each of said flow passages, whereby an intermediate pressure is effected between each of said pair of flow openings; movable wall means including areas having said intermediate pressures acting thereon in one direction and said high and low pressures acting in an opposite direction; and means for adjusting one of the restricted openings in each of said flow passages to pre-set said intermediate pressures for preselected values.

10. Control apparatus, comprising: a pair of parallel flow passages connected between a high pressure fluid source and a low pressure fluid source; a pair of spaced sonic velocity flow restrictions in each of said flow passages, whereby intermediate flow pressures are effected; movable wall means including areas having said intermediate pressures acting thereon in one direction, and said high and low pressures acting in an opposite direction; and a control device varied in response to movement of said wall means.

11. Control apparatus for maintaining the pressure ratio between first and second pressures at a selected value, comprising: a pair of flow passages positioned between said first and second pressures; a pair of spaced restricted sonic velocity flow openings in each of said flow passages, whereby an intermediate pressure is effected between each of said pair of flow openings; movable wall means including areas having said intermediate pressures acting thereon in one direction and said first and second pressures acting in an opposite direction; means for adjusting one of the restricted openings in each of said flow passages to pre-set said intermediate pressures; and control means actuated in response to movement of said wall means to maintain the pressure ratio between said first and second pressures at the selected value.

References Cited in the file of this patent

UNITED STATES PATENTS

| | | |
|---|---|---|
| 1,776,741 | Schwab | Sept. 23, 1930 |
| 1,953,110 | Holtane | Apr. 3, 1934 |
| 2,053,797 | King | Sept. 8, 1936 |
| 2,178,864 | Rosenberger | Nov. 7, 1939 |
| 2,544,427 | Ifield | Mar. 6, 1951 |
| 2,564,253 | Ifield | Aug. 14, 1951 |
| 2,570,624 | Wyckoff | Oct. 9, 1951 |
| 2,641,105 | Drake | June 9, 1953 |
| 2,645,240 | Drake | July 14, 1953 |
| 2,767,725 | Long | Oct. 23, 1956 |
| 2,850,871 | Drake | Sept. 9, 1958 |
| 2,864,393 | Drake | Dec. 16, 1958 |
| 2,884,905 | Jensen | May 5, 1959 |